(12) United States Patent
Wu

(10) Patent No.: US 12,345,616 B2
(45) Date of Patent: Jul. 1, 2025

(54) PARTICLE CONTENT EXTRACTION DEVICE

(71) Applicant: Pengfei Wu, Richmond hill (CA)

(72) Inventor: Pengfei Wu, Richmond hill (CA)

( * ) Notice: Subject to any disclaimer, the term of this patent is extended or adjusted under 35 U.S.C. 154(b) by 286 days.

(21) Appl. No.: 18/074,586

(22) Filed: Dec. 5, 2022

(65) Prior Publication Data

US 2024/0183757 A1    Jun. 6, 2024

(51) Int. Cl.
*G01N 1/14* (2006.01)
*G01N 1/28* (2006.01)
*G01N 1/38* (2006.01)

(52) U.S. Cl.
CPC .............. *G01N 1/14* (2013.01); *G01N 1/286* (2013.01); *G01N 1/38* (2013.01)

(58) Field of Classification Search
None
See application file for complete search history.

(56) References Cited

U.S. PATENT DOCUMENTS

| 10,822,244 | B2 * | 11/2020 | Wu | B01J 29/85 |
| 2016/0041124 | A1 * | 2/2016 | Kim | B01L 99/00 |
| | | | | 204/601 |

* cited by examiner

*Primary Examiner* — John E Breene
*Assistant Examiner* — Nigel H Plumb
(74) *Attorney, Agent, or Firm* — JEEN IP LAW, LLC

(57) ABSTRACT

A particle content extraction device, comprising: a first extracting unit, configured to extract, from a whole sample containing a target particle, an extraction sample containing the target particle without performing an abort processing; a second extracting unit, configured to subject the extraction sample to the abort processing and to extract the target particles; and a stirring unit, arranged in a flow path between the first extracting unit and the second extracting unit and configured to vary particle interval in the extraction sample extracted from the first extracting unit, and the stirring unit comprises a tubular member connected to a pump to provide the extraction sample to the second extracting unit. The particle content extraction device can quickly analyze and extract the particle components through the extraction process provided by the present application, which is convenient for users to carry out analysis work.

8 Claims, 5 Drawing Sheets

PARTICLE CONTENT EXTRACTION DEVICE

TECHNICAL FIELD

The present application relates to the technical field of particle extraction, and discloses a particle content extraction device.

BACKGROUND

In conventional particle extraction technology, when extraction is performed, a liquid and particles present in a certain finite volume are taken in together. Therefore, in a case where it is attempted to extract a target particle, if a distance between the target particle and a particle spatially adjacent thereto is small, a possibility that the adjacent particle will be taken in together increases. Therefore, in order to extract a target particle at high speed in the flow cytometer, a probability that a non-target particle is taken in together with the target particle increases, and a ratio (also referred to as "purity") of the target particle with respect to an extracted whole sample decrease disadvantageously.

SUMMARY

Aiming at the deficiencies of the prior art, the present application provides a particle content extraction device, which solves the problems raised in the background art above.

In order to achieve the above object, the application provides the following technical solutions: a particle content extraction device, comprising: a first extracting unit, configured to extract, from a whole sample containing a target particle, an extraction sample containing the target particle without performing an abort processing; a second extracting unit, configured to subject the extraction sample to the abort processing and to extract the target particles; and a stirring unit, arranged in a flow path between the first extracting unit and the second extracting unit and configured to vary particle interval in the extraction sample extracted from the first extracting unit, and the stirring unit comprises a tubular member connected to a pump to provide the extraction sample to the second extracting unit.

Preferably, the first extracting unit and the second extracting unit are formed as separate members, and after extraction by the first extracting unit, extraction by the second extracting unit is performed.

Preferably, the first extracting unit and the second extracting unit are formed as the same member, and after extraction by the first extracting unit, extraction by the second extracting unit is performed.

Preferably, the stirring unit is configured to return the particle interval in an extraction sample extracted by the first extracting unit to a random state.

Preferably, further comprising: a measurement unit for measuring a ratio of a target particle with respect to the whole sample; and an extraction switching unit for switching an extraction operation by the first extracting unit and an extraction operation by the second extracting unit to a parallel operation on the basis of a measurement result by the measurement unit.

Preferably, comprising: a first extraction step of extracting, from a whole sample containing a target particle, an extraction sample containing the target particle without performing abort processing; and a stirring step of varying a particle interval in the extraction sample; and a second extraction step of subjecting the extraction sample having a varied particle interval to abort processing and extracting the target particle by the second extracting unit, wherein the stirring unit comprises a tubular member connected to a pump to provide the extraction sample to the second extracting unit.

Preferably, the second extraction step of subjecting the extraction sample having a varied particle interval to abort processing and extracting the target particle by the second extracting unit comprising a stirring step of returning the particle interval in the extraction sample to a random state after the first extraction step is performed.

Preferably, further comprising an extraction switching step of performing the first extraction step and the second extraction step in parallel on the basis of a ratio of a target particle with respect to the whole sample.

Preferably, comprising: a first extracting unit, configured to extract, from a whole sample containing a target particle, an extraction sample containing target particle without performing abort processing; a second extracting unit, configured to subject the extraction sample to the abort processing and to extract the target particles; and a stirring unit, arranged in a flow path between the first extracting unit and the second extracting unit and configured to vary particle interval in the extraction sample extracted from the first extracting unit, and the stirring unit comprises a tubular member connected to a pump to provide the extraction sample to the second extracting unit.

Compared with the prior art, the present application provides a particle content extraction device, which has the following beneficial effects:

Through the extraction process provided by the present application, the particle content extraction device can quickly analyze and extract the particle components through the extraction process provided by the present application, which is convenient for users to carry out analysis work. The present technology provides microparticle extraction technology capable of stably extracting only a target microparticle at high speed from a sheath flow flowing through a flow path.

DETAILED DESCRIPTION

The technical solutions in the embodiments of the present application will be clearly and completely described below in conjunction with the drawings in the embodiments of the present application. Apparently, the described embodiments are only some of the embodiments of this application, not all of them. Based on the embodiments in the present application, all other embodiments obtained by persons of ordinary skill in the art without making creative efforts belong to the scope of protection of this application.

Please refer to FIGS. 1-4, the present application provides a particle content extraction device 10: comprising: a first extracting unit 100, configured to extract, from a whole sample containing a target particle, an extraction sample containing the target particle without performing an abort processing; a second extracting unit 200, configured to subject the extraction sample to the abort processing and to extract the target particles; and a stirring unit 300, arranged in a flow path between the first extracting unit 100 and the second extracting unit 200 and configured to vary particle interval in the extraction sample extracted from the first extracting unit 100, and the stirring unit 300 comprises a tubular member connected to a pump to provide the extraction sample to the second extracting unit 200. The first extracting unit 100 and the second extracting unit 200 are formed as separate members, and after extraction by the first extracting unit 100, extraction by the second extracting unit 200 is performed.

Figure 1:
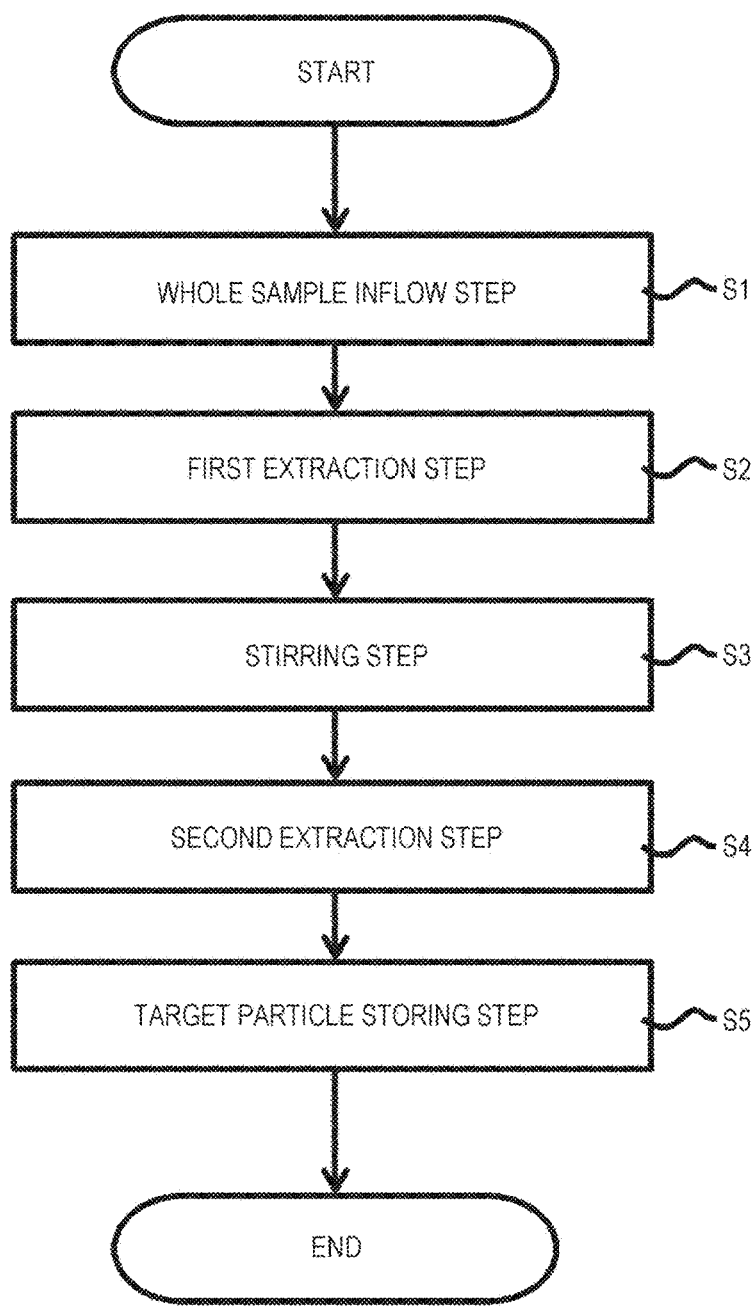
FIG. 1 is a structural flow diagram of a particle content extraction device proposed by the present application.
Figure 2:
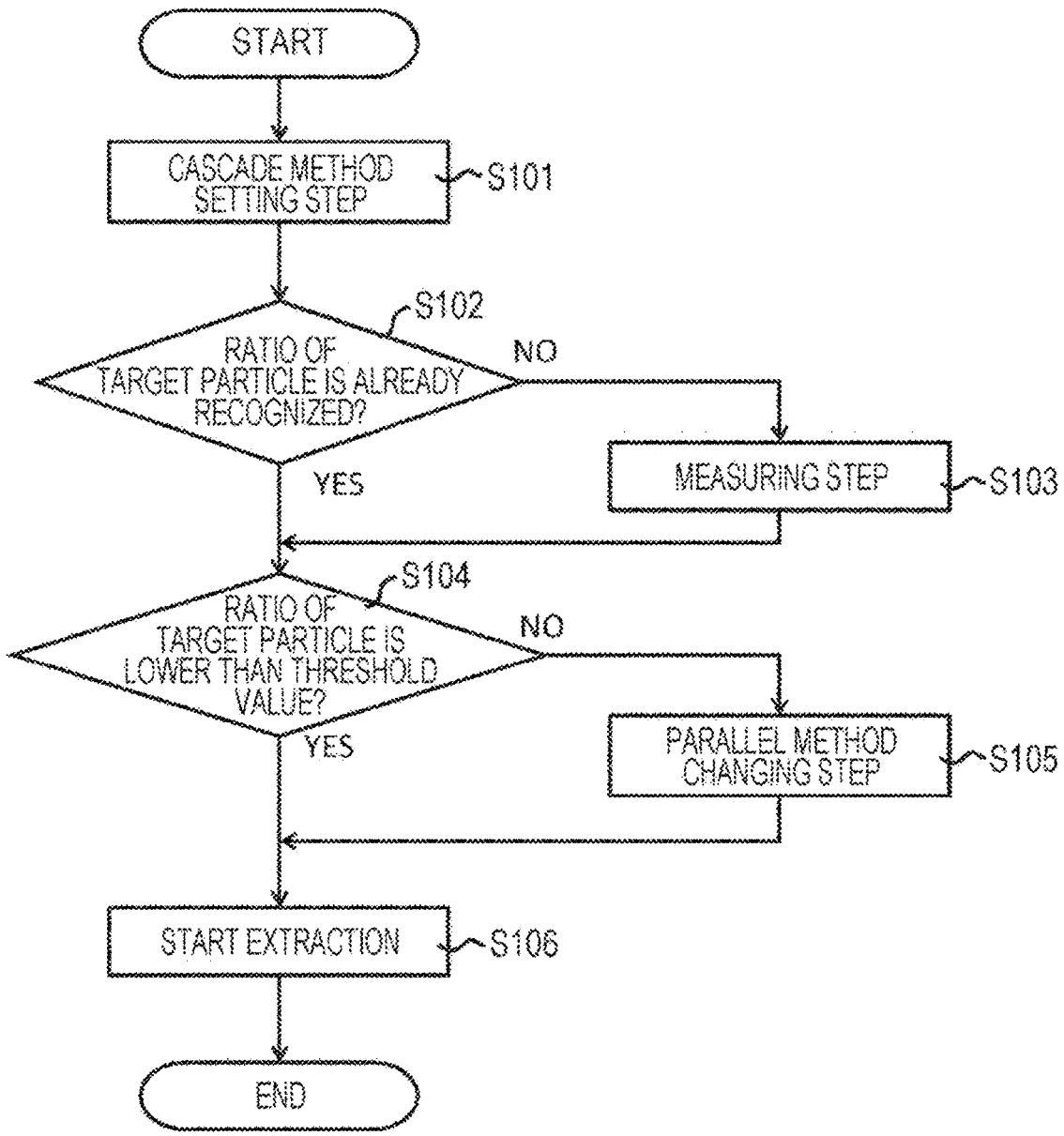
FIG. 2 is a structural extraction flow chart of the particle content extraction device proposed in the present application.
Figure 3:
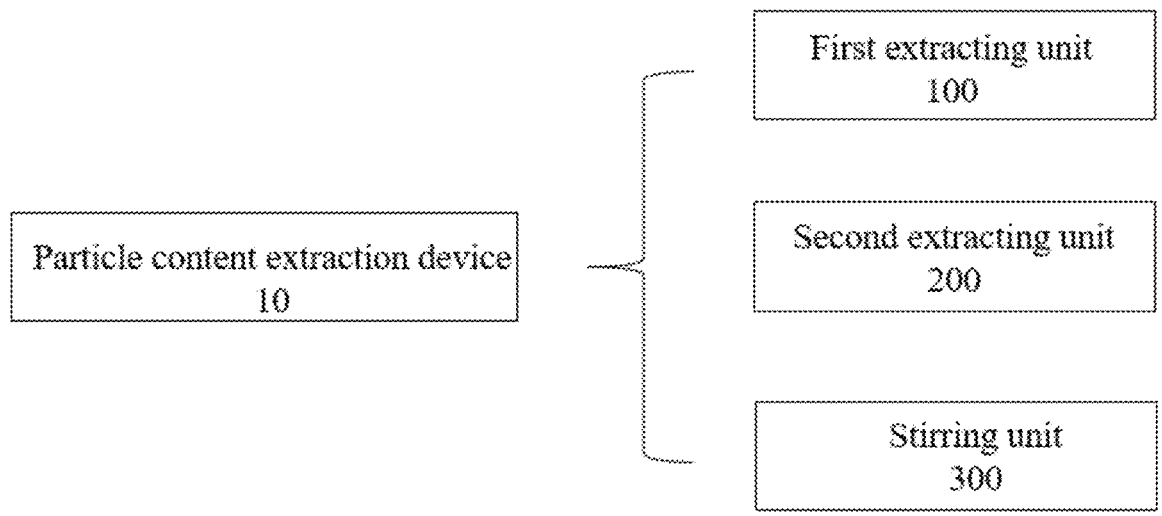
FIG. 3 is a first schematic diagram of the particle content extraction device of the present application.
Figure 4:
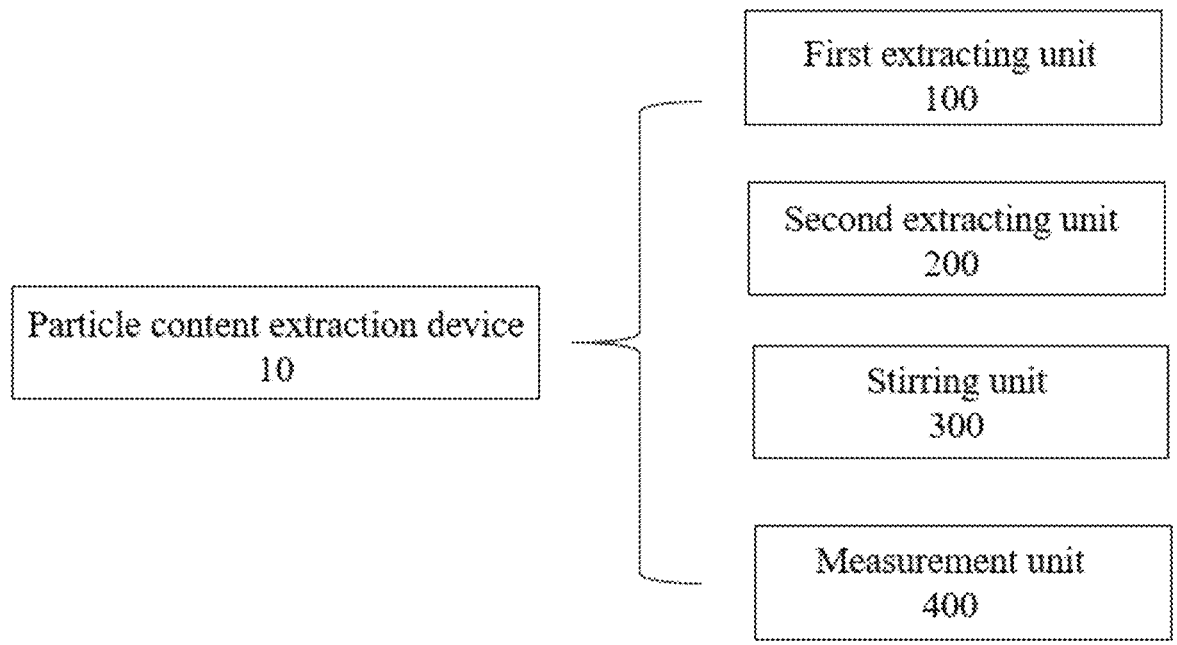
FIG. 4 is a second schematic diagram of the particle content extraction device of the present application.

The first extracting unit 100 and the second extracting unit 200 are formed as the same member, and after extraction by the first extracting unit 100, extraction by the second extracting unit 200 is performed. The stirring unit 300 is configured to return the particle interval in an extraction sample extracted by the first extracting unit 100 to a random state, and further comprising: a measurement unit 400 for measuring a ratio of a target particle with respect to the whole sample, as shown in FIG. 4; and an extraction switching unit for switching an extraction operation by the first extracting unit 100 and an extraction operation by the second extracting unit 200 to a parallel operation on the basis of a measurement result by the measurement unit 400, comprising: a first extraction step of extracting, from a whole sample containing a target particle, an extraction sample containing the target particle without performing abort processing; and a stirring step of varying a particle interval in the extraction sample; and a second extraction step of subjecting the extraction sample having a varied particle interval to abort processing and extracting the target particle by the second extracting unit 200, wherein the stirring unit 300 comprises a tubular member connected to a pump to provide the extraction sample to the second extracting unit 200. The second extraction step of subjecting the extraction sample having a varied particle interval to abort processing and extracting the target particle by the second extracting unit 200 comprising a stirring step of returning the particle interval in the extraction sample to a random state after the first extraction step is performed, and further comprising: a first extracting unit 100, configured to extract, from a whole sample containing a target particle, an extraction sample containing target particle without performing abort processing; a second extracting unit 200, configured to subject the extraction sample to the abort processing and to extract the target particles; and a stirring unit 300, arranged in a flow path between the first extracting unit 100 and the second extracting unit 200 and configured to vary particle interval in the extraction sample extracted from the first extracting unit 100, and the stirring unit 300 comprises a tubular member connected to a pump to provide the extraction sample to the second extracting unit 200.

To sum up, through the extraction process provided by the present application, the particle content extraction device 10 can quickly analyze and extract the particle components through the extraction process provided by the present application, which is convenient for users to carry out analysis work. The present technology provides microparticle extraction technology capable of stably extracting only a target microparticle at high speed from a sheath flow flowing through a flow path.

Figure 5:
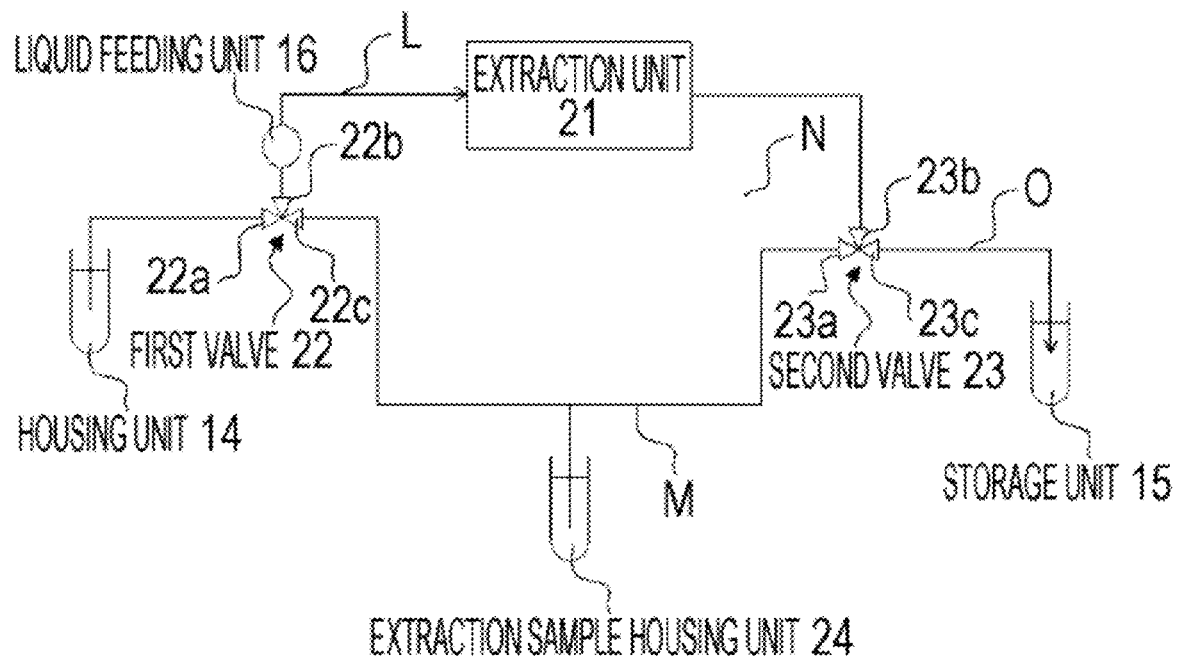
FIG. 5 is a schematic diagram of a particle content extraction device in the prior art.

It should be noted that in this application, relative terms such as first and second are only used to distinguish one entity or operation from another entity or operation, without necessarily requiring or implying any such actual relationship or order between these entities or operations. The term "comprises", "includes" or any other variation thereof is intended to cover a non-exclusive inclusion such that a process, method, article or device comprising a set of elements includes not only those elements but also other elements not expressly listed elements, or also elements inherent in such a process, method, article, or device. Without further limitations, an element defined by the phrase "comprising a . . . " does not exclude the presence of additional identical elements in the process, method, article or device comprising said element, FIG. 5 is a schematic diagram of a particle content extraction device in the prior art.

Although the embodiments of the present application have been shown and described, those skilled in the art can understand that various changes, modifications and substitutions can be made to these embodiments without departing from the principle and spirit of the present application. The scope of the present application is defined by the claims appended hereto and their equivalents.

What is claimed is:

1. A particle content extraction device, comprising: a first extracting unit, configured to extract, from a whole sample containing a target particle, an extraction sample containing the target particle without performing abort processing; a second extracting unit, configured to subject the extraction sample to the abort processing and to extract the target particle; and a stirring unit, arranged in a flow path between the first extracting unit and the second extracting unit and configured to vary a particle interval in the extraction sample extracted from the first extracting unit, and the stirring unit comprises a tubular member connected to a pump to provide the extraction sample to the second extracting unit.

2. The particle content extraction device according to claim 1, wherein the first extracting unit and the second extracting unit are formed as separate members, and after extraction by the first extracting unit, extraction by the second extracting unit is performed.

3. The particle content extraction device according to claim 1, wherein the first extracting unit and the second extracting unit are formed as the same member, and after extraction by the first extracting unit, extraction by the second extracting unit is performed.

4. The particle content extraction device according to claim 1, wherein the stirring unit is configured to return the particle interval in an extraction sample extracted by the first extracting unit to a random state.

5. The particle content extraction device according to claim 1, wherein further comprising: a measurement unit for measuring a ratio of the target particle with respect to the whole sample; and an extraction switching unit for switching an extraction operation by the first extracting unit and an extraction operation by the second extracting unit to a parallel operation on the basis of a measurement result by the measurement unit.

6. An extraction method of the particle content extraction device according to claim 1, comprising:

a first extraction step of extracting, from a whole sample containing a target particle, an extraction sample containing the target particle without performing abort processing;

a stirring step of varying a particle interval in the extraction sample; and a second extraction step of subjecting the extraction sample having a varied particle interval to abort processing and extracting the target particle by the second extracting unit, wherein the stirring unit comprises a tubular member connected to a pump to provide the extraction sample to the second extracting unit.

7. The extraction method according to claim 6, wherein the second extraction step of subjecting the extraction sample having a varied particle interval to abort processing and extracting the target particle by the second extracting unit comprises a stirring step of returning the particle interval in the extraction sample to a random state after the first extraction step is performed.

8. The extraction method according to claim 6, further comprises an extraction switching step of performing the first extraction step and the second extraction step in parallel on the basis of a ratio of the target particle with respect to the whole sample.

* * * * *